US010825138B2

(12) United States Patent
Wang et al.

(10) Patent No.: US 10,825,138 B2
(45) Date of Patent: Nov. 3, 2020

(54) SUPER RESOLUTION USING FIDELITY TRANSFER

(71) Applicant: Magic Pony Technology Limited, London (GB)

(72) Inventors: Zehan Wang, London (GB); Robert David Bishop, London (GB); Lucas Theis, London (GB)

(73) Assignee: Magic Pony Technology Limited, London (GB)

( * ) Notice: Subject to any disclaimer, the term of this patent is extended or adjusted under 35 U.S.C. 154(b) by 118 days.

(21) Appl. No.: 15/856,895

(22) Filed: Dec. 28, 2017

(65) Prior Publication Data

US 2018/0122047 A1  May 3, 2018

Related U.S. Application Data

(63) Continuation of application No. PCT/GB2017/050691, filed on Mar. 14, 2017.

(30) Foreign Application Priority Data

Mar. 14, 2016 (GB) .................................. 1604345.7

(51) Int. Cl.
*G06T 3/40* (2006.01)
(52) U.S. Cl.
CPC .......... *G06T 3/4046* (2013.01); *G06T 3/4053* (2013.01)
(58) Field of Classification Search
None
See application file for complete search history.

(56) References Cited

U.S. PATENT DOCUMENTS

| 8,913,827 | B1 | 12/2014 | Fang |
| 9,258,518 | B2 * | 2/2016 | Salvador ............... G06T 3/4053 |
| 9,836,820 | B2 * | 12/2017 | Tuzel ........................ G06T 5/00 |
| 10,019,642 | B1 * | 7/2018 | Navarrete Michelini ................... G06T 3/40 |
| 10,262,243 | B2 * | 4/2019 | Lim ...................... G06T 3/4053 |
| 2007/0153341 | A1 | 7/2007 | Kang |

(Continued)

FOREIGN PATENT DOCUMENTS

WO  2014174087 A1  10/2014
WO  2016132152 A1  8/2016

(Continued)

OTHER PUBLICATIONS

Marco Bevilacqua. Algorithms for super-resolution of images and videos based on learning methods. Image Processing. Université Rennes 1, 2014. English (Year: 2014).*

(Continued)

*Primary Examiner* — Andrae S Allison
(74) *Attorney, Agent, or Firm* — Brake Hughes Bellermann LLP

(57) ABSTRACT

Systems and methods for developing improved-fidelity visual data using fidelity data and using a hierarchical algorithm are provided. An example method includes receiving at least a plurality of neighbouring sections of visual data, selecting a plurality of input sections from the received plurality of neighbouring sections of visual data, extracting features from the plurality of input sections of visual data, and producing the improved-fidelity visual data by applying the fidelity data to the extracted features.

20 Claims, 1 Drawing Sheet

(56) References Cited

U.S. PATENT DOCUMENTS

| | | | |
|---|---|---|---|
| 2008/0186390 A1* | 8/2008 | Sato | G06T 3/4053 348/222.1 |
| 2010/0027905 A1 | 2/2010 | Zhang et al. | |
| 2014/0333644 A1 | 11/2014 | Goldman et al. | |
| 2016/0247259 A1* | 8/2016 | Toyoda | G06T 3/40 |
| 2017/0140506 A1* | 5/2017 | Sato | H04N 7/01 |
| 2017/0323223 A1* | 11/2017 | Nagata | G06T 3/40 |
| 2017/0347110 A1* | 11/2017 | Wang | G06T 3/4046 |
| 2018/0144447 A1* | 5/2018 | Tate | G06T 5/003 |

FOREIGN PATENT DOCUMENTS

| | | |
|---|---|---|
| WO | 2016156864 A1 | 10/2016 |
| WO | 2017/158341 A1 | 9/2017 |

OTHER PUBLICATIONS

Wang et al, Deep Networks for Image Super-Resolution with Sparse Prior, https://arxiv.org/pdf/1507.08905v4.pdf, Oct. 15, 2015. (Year: 2015).*

Dong, Chao, et al. "Learning a deep convolutional network for image super-resolution." European conference on computer vision. Springer, Cham, 2014 (Year: 2014).*

Zhang, Kaibing, et al. "Learning multiple linear mappings for efficient single image super-resolution." IEEE Transactions on Image Processing 24.3 (2015): 846-861. (Year: 2015).*

International Search Report for Application No. GB1604345.7, dated Oct. 28, 2016, 4 pages.

International Search Report and Written Opinion for PCT Application No. PCT/GB2017/050691, dated Jun. 27, 2017, 17 pages.

Baker, et al., "Hallucinating Faces", Proceedings of the Fourth IEEE International Conference on Automatic Face and Gesture Recognition, Mar. 28, 2000, pp. 83-88.

Dong, et al., "Learning a Deep Convolutional Network for Image Super-Resolution", ECCV 2014, Part IV, LNCS 8692, Sep. 6, 2014, pp. 184-199.

Datsenko, et al, "Example-based Single Document Image Super-Resolution: A Global MAP Approach With Outlier Rejection", Multidimensional Systems and Signal Processing, vol. 18, No. 2-3, Apr. 13, 2007, pp. 103-121.

Zhang, et al., "Single Image Super-Resolution With Multiscale Similarity Learning", IEEE Transactions on Neural Networks and Learning Systems, vol. 24, No. 10, Oct. 1, 2013, pp. 1648-1659.

Nasrollahi, et al., "Super-Resolution: A Comprehensive Survey", Machine Vision and Applications, vol. 25, No. 6, Aug. 1, 2014, 52 pages.

Yoshikawa, et al., "Super Resolution Image Reconstruction Using Total Variation Regularization and Learning-Based Method", 17th IEEE International Conference on Image Processing, Sep. 26, 2010, pp. 1993-1996.

* cited by examiner

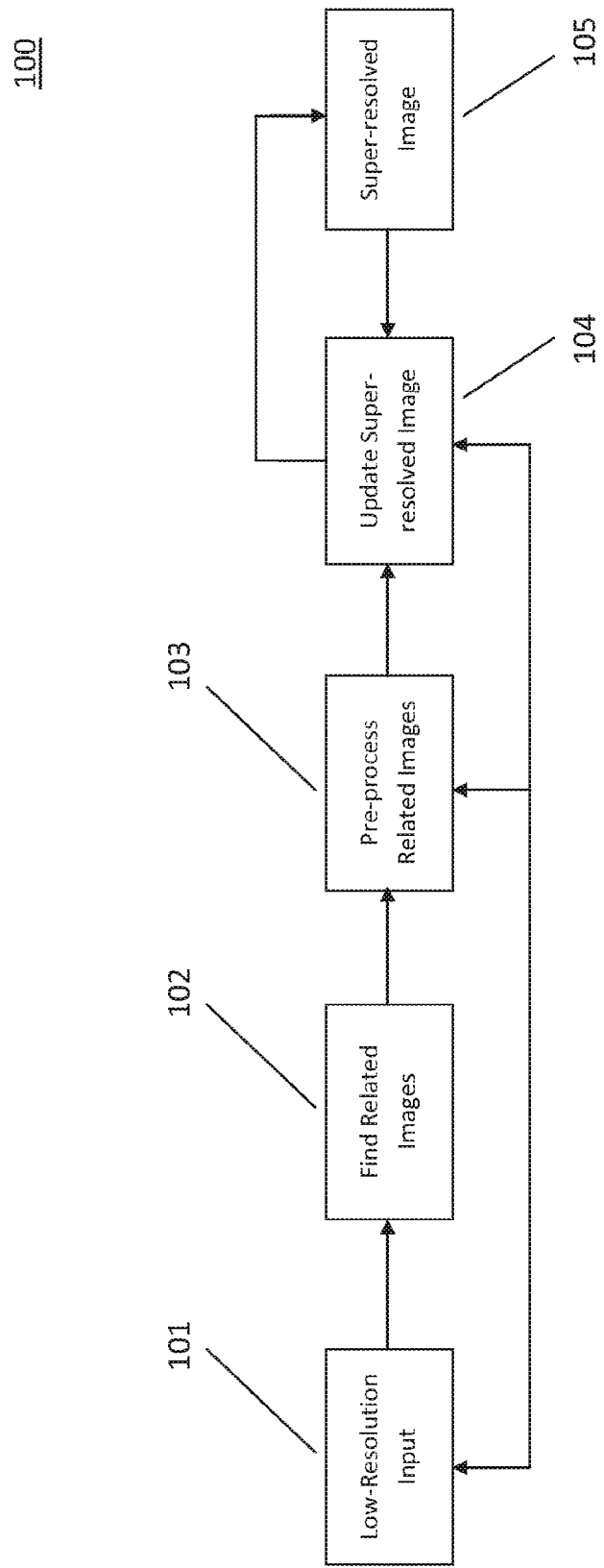

SUPER RESOLUTION USING FIDELITY TRANSFER

CROSS REFERENCE TO RELATED APPLICATIONS

This application is a continuation of, and claims priority to, International Patent Application No. PCT/GB2017/050691, filed on Mar. 14, 2017, which claims priority to United Kingdom Application No. GB 1604345.7, filed on Mar. 14, 2016, the contents of both of which are incorporated herein by reference.

TECHNICAL FIELD

The present disclosure relates to modifying visual data based upon fidelity data provided as an input.

BACKGROUND

Synthesising content by example has long been established as a problem in computer vision and graphics. Synthesised content has a number of uses and applications in a variety of areas, from image manipulation and editing to scientific applications.

In some cases, it may be desirable to transpose the style of one image (or a portion thereof) onto the content of another image or image portion.

Similarly, it may be desirable to enhance the resolution of visual data based upon visual data of a similar style and also improve the fidelity, for example by adding detail (aside from any changes or increases in resolution of the image).

In current methods, images may be split into content inputs and style inputs. The content input defines the layout and positioning of objects within the image, and the style input defines the "building blocks" of the image, such as colour or, in the case where the resolution of the visual data needs to be enhanced, the style input may be images with a higher-resolution, which may be similar to the visual data to be enhanced. However, current methods only focus on the style of still image data and not the resolution or fidelity of the image from which transfers are performed.

SUMMARY

Aspects and/or implementations are set out in the appended claims. Some aspects and/or implementations can improve the effectiveness of synthesising content using machine learning techniques. These and other aspects and implementations are also described herein.

Certain aspects and/or implementations seek to provide techniques for generating hierarchical algorithms that can be used to create improved-fidelity visual data based on an original received input visual data and a piece of reference fidelity visual data.

Other aspects and/or implementations seek to provide techniques for machine learning.

According to a first aspect, there is provided a computer-implemented method for developing improved-fidelity visual data using fidelity data and using a hierarchical algorithm, the method comprising the steps of receiving at least a plurality of neighbouring sections of visual data; selecting a plurality of input sections from the received plurality of neighbouring sections of visual data; extracting features from the plurality of input sections of visual data; producing the improved-fidelity visual data by applying the fidelity data to the extracted features.

Some implementations provide for a method of developing improved-fidelity visual data based upon fidelity data using a hierarchical algorithm, whereby a plurality of neighbouring sections of visual data, such as a number of frames of video, are received, and enhanced using higher-fidelity data to produce a super-resolved version of the received visual data such that the super-resolved version has a higher-fidelity than the received visual data.

In implementations, applying the fidelity data to the extracted features comprises performing a fidelity transfer.

In implementations, applying the fidelity data to the extracted features comprises optimising a function dependent on content features of the input sections, and features (e.g. high-frequency features) of the fidelity data.

In implementations, applying the fidelity data to the extracted features comprises transposing features (e.g. high frequency features) of the fidelity data onto the content of the extracted features.

In some implementations, the selected input sections comprise lower quality visual data and the improved-fidelity visual data comprises higher quality visual data. The higher quality visual data may comprise visual data having a higher resolution compared to said lower-quality visual data.

The improved-fidelity visual data may include additional visual data (e.g. high-frequency components) not present in the input sections selected from the received plurality of neighbouring sections of visual data.

The extracted features may be extracted using the hierarchical algorithm. The hierarchical algorithm may comprise a neural network. The neural network may comprise a convolutional neural network.

The fidelity data may be selected based on similarity with the input sections, wherein similarity is determined using a predetermined function.

The fidelity data may comprise one or more images.

The fidelity data may comprise data produced by a hierarchical algorithm trained to extract features from higher quality visual data.

In some implementations, the fidelity data is extracted from a plurality of fidelity visual data, which may have been received, and wherein the plurality of fidelity visual data may be selected such that a pre-determined similarity function is maximized.

In some implementations. the fidelity data may be stored locally or it may be received and extracted from the plurality of fidelity visual data, which may be a selection of images and/or videos determined to be similar to the received visual data. In these implementations, the similarity may be assessed based upon a pre-determined similarity constant with the aim of maximizing the similarity between the fidelity visual data and the received visual data.

In some implementations, a section of the visual data may comprise a sequence of frames of visual data or a region within a frame or sequence of frames of visual data, which may be a plurality of frames of video, or a plurality of rendered frames.

Depending on the visual data being processed, in some implementations models can be selected for sections of visual data comprising a sequence of frames or a region within a frame or sequence of frames. In these implementations each could be necessary in order to provide the most efficient method of developing a higher quality version of a part of the original visual data using the fidelity data.

In some implementations, the received plurality of neighbouring sections of visual data are consecutive sections of visual data.

In some implementations the use of consecutive sections of visual data enables more accurate application of the fidelity data to the received visual data. Receiving a plurality of sections or consecutive sections in such implementations can provide more information able to be used when applying the fidelity data to the sections of visual data.

In some implementations, the selecting of a plurality of input sections of visual data may comprise a patch-based or a segment-based analysis of the received sections of visual data.

In some implementations, analysing the visual data to select a plurality of input sections enables a more accurate application of the fidelity data to the received visual data. In these implementations the selection of the input sections enables the most efficient method of selecting fidelity data similar to the received visual data.

In some implementations, the hierarchical algorithm comprises a plurality of layers, furthermore the layers may be any of sequential, recurrent, recursive, branching or merging.

Having a number of layers in some implementations, which may or may not be sequential, recurrent, recursive, branching or merging allows different levels of processing to occur at different times and the layers can work in parallel, ensuring optimal efficiency when enhancing the resolution of the visual data.

In some implementations, the extracting of features is based on a predetermined extraction metric.

In some implementations, enabling a variety of features to be extracted as set by the predetermined extraction metric ensures the enhancement can be tailored to a specific system. As such, in some of these implementations the computational expense can be increased or decreased appropriately based on system resources.

In some implementations, the hierarchical algorithm is developed using a learned approach.

In some implementations, hierarchical or non-hierarchical algorithms can be substantially accurate and therefore enable a more accurate reconstruction, for example produce higher quality visual data from the low-quality visual data that is transmitted, for example where quality can be measured by resolution, a perceptual measure or metric determining that the quality is sufficiently aesthetically pleasing or by a low reproduction error rate in comparison to the original high-quality visual data. In another example, the hierarchical or non-hierarchical algorithms can produce higher quality versions of visual data using the fidelity data. In some optional implementations, a down-sampled version of the resulting visual data comes out to be the same or similar as a down-sampled version of the original visual data. In some implementations, using a learned approach can substantially tailor the hierarchical model or models for each portion of visual data.

In some implementations, the learned approach comprises machine learning techniques. The hierarchical algorithm may also be a non-linear hierarchical algorithm which may comprise one or more convolutional neural networks.

In some implementations, non-linear models can be substantially accurate in reconstructing visual data than dictionary-based approaches. In these implementations, through using a learning-based approach, i.e. an approach that does not rely on pre-defined visual data features and operators, the model(s) can be optimised for each section or sequence of sections.

In some implementations, the training of convolutional neural networks can be more computationally complex than dictionary learning for a similar accuracy, but the resulting model or algorithm can also be more flexible in representing visual data while using fewer coefficients for the reconstruction. In some implementations, the resultant convolutional neural network model to be transmitted alongside the lower-quality visual data can be both smaller and can be more accurate in the reconstruction of the higher-quality visual data.

Some aspects can provide an improved technique for generating reconstruction parameters that can be used, when converting original high-quality visual data into a down-sampled low-quality visual data, to allow recreation of higher quality visual data without significant loss in quality, for example having a low reconstruction error in comparison with the original visual data, and with a reduction in visual data transferred over a network. In such aspects, the application of such a technique can reduce the data transmitted when transmitting visual data in comparison with existing techniques while enabling reproduction of the visual data at its original quality without significant loss in quality in comparison to the original visual data (where quality can be defined by objective metrics such as error rate, PSNR and SSIM as well as subjective measures) or, based on a perception measure or metric rather than on a pixel-wise comparison of images. In such aspects, such a proposed technique can allow minimal changes to be made to the overall infrastructure of service providers, as it can augment most existing compression techniques, and can provide advantages in encoding and streaming applications.

In some implementations, the hierarchical algorithm may use super-resolution techniques and/or a spatio-temporal approach.

In some implementations, for use for a section of visual data, the example based model may be a neural network and can use spatio-temporal convolution. In some implementations, separating visual data into a series of sections allows for the individual sections to be down-sampled thus reducing the visual data size, thereby allowing for lower quality sections to be transmitted as re-encoded visual data in the original or In some implementations a more optimal codec but at a lower quality. In some implementations, a spatio-temporal network can allow an improvement in performance by exploiting the temporal information in the visual data and, for example, within a similar scene in sequential sections of visual data, there may be stationary sections of background in the sequential sections providing information relevant for the higher-quality version of that scene such that temporally consecutive sections can be used to super resolve one section.

Aspects and/or implementations include a computer program product comprising software code to effect the method and/or apparatus of other aspects and/or implementations herein described.

It should be noted that in some aspects and/or implementations, the terms model and/or algorithm and/or representation and/or parameters and/or functions can be used interchangeably.

It should also be noted that visual data, in some implementations, may comprise image and/or video data.

References to visual data can be references to video data and/or image data in some aspects and/or implementations and vice versa. References to low-quality and/or lower-quality can be references to low-resolution and/or lower-resolution in some aspects and/or implementations and vice versa. References to high-quality and/or higher-quality and/or highest quality and/or original quality can be references to high-resolution and/or higher-resolution and/or highest-resolution and/or original resolution and/or increased fidelity in some aspects and/or implementations and vice versa. References to sections can be references to frames and/or portions of frames in some aspects and/or implementations and vice versa. References to enhance or enhancement can be references to upscale and/or upscaling in some aspects and/or implementations and vice versa.

BRIEF DESCRIPTION OF FIGURES

Implementations will now be described, by way of example only and with reference to the accompanying drawing, in which:

FIG. 1 illustrates a flow chart showing the method of producing super-resolved images based on a low resolution input and fidelity visual data.

DETAILED DESCRIPTION

Various implementations will now be described below in detail with reference to the FIGURE referenced above.

In some implementations, visual data being received may be of a lower than desirable quality, such as at a low resolution or a low frame rate. It will be appreciated other features may render the visual data lower than desirable quality. In some implementations, the visual data may be a lower-resolution than desired. One or more hierarchical algorithms may be used to increase the quality of the visual data to a more desirable quality. Fidelity data may be received from other visual data provided as an input or, may be a set of parameters or characteristics stored in a memory of a device configured to perform the method.

For example, in some implementations, the hierarchical algorithm may increase the resolution of the received visual data section or sections. In another implementation the hierarchical algorithm may develop intermediate sections, such as a section to be placed between two received sections of visual data. In yet another implementation, the hierarchical algorithm may be used to increase the quality of the received visual data by combining the above-mentioned implementations. In any of the above implementations, the fidelity data may be used to produce a higher-quality version of the developed sections of visual data. A specific example of optimizing visual data using super-resolutions is described below.

One approach for enhancing visual data may use a neural network $\phi$ to predict high-resolution images $x_{HR}$ from low-resolution images $x_{LR}$ by minimizing the squared error over training examples $x_{LR}^i$, $x_{HR}^i$, $$\sum_i \|x_{HR}^i - \phi(x_{LR}^i)\|^2 \qquad \text{Equation 1}$$

with respect to the parameters of $\phi$. In some implementations, $\phi$ may be used to predict feature representations of the image $\psi(x_{HR})$ giving $$\sum_i \|\psi(x_{HR}^i) - \phi(x_{LR}^i)\|^2 \qquad \text{Equation 2}$$

To get the pixel representation of the image, it is desirable to minimise $$\|\psi(x) - \phi(x_{LR})\| \qquad \text{Equation 3}$$

with respect to x for a given $x_{LR}$. For $\psi$, representations learned by a neural network trained to recognize object may be used.

In some implementations fidelity data may be determined from received fidelity visual data, where content features, $\psi_c(x)$, and style features, $\psi_s(x)$ are computed using the activations of the different layers of a neural network trained for object recognition The features are derived from the activations of the different layers of a neural network trained on object recognition. In some implementations the fidelity visual data may be an image, rendered data or a number of frames of video.

In some implementations, a fidelity transfer between two pieces of visual data, $x_c$ and $x_s$, can be achieved by minimizing:

$$\alpha\|\psi_c(x) - \psi_c(x_c)\|^2 + \beta\|\psi_s(x) - \psi_s(x_s)\|^2 \qquad \text{Equation 4}$$

with respect to x, where $\alpha$ and $\beta$ are additional parameters controlled by the user. The resulting visual will have content similar to $x_c$ and style similar to $x_s$.

In another implementation, features of the fidelity visual data may be divided into local patches $\psi_{si}(x)$. In this implementation, rather than minimizing the distance of $\psi_{si}(x)$ to $\psi_{si}(x_s)$, the distance to another patch $\psi_{s\ j(i)}(x_s)$ is minimized. The other patch is selected to be a patch that is as similar as possible in terms of cosine similarity, $$j(i) = \operatorname{argmax}_j \frac{\psi_{si}(x)^T \psi_{sj}(x_s)}{\|\psi_{si}(x)\| \cdot \|\psi_{sj}(x_s)\|} \qquad \text{Equation 5}$$

Computing and updating the indices j(i) is alternated with the optimizing of the visual data x by minimizing:

$$\|\psi_c(x) - \psi_c(x_c)\|^2 + \sum_i \|\psi_{si}(x) - \psi_{sj(i)}(x_s)\|^2 \qquad \text{Equation 6}$$

These implementations can be used in combination with other implementations, and portions of implementations, described elsewhere in this specification.

In some implementations, one or more hierarchical algorithms may be used to estimate higher-resolution versions of received lower-resolution visual data. In some implementations, lower-resolution visual data may be received and enhanced to a higher resolution. In such implementations, upon receiving multiple lower-resolution frames, a hierarchical algorithm can be used, along with the fidelity data to estimate a higher resolution version of a specific received frame. In some implementations, on the receipt of three or more consecutive frames of lower-resolution visual data a hierarchical algorithm may be used to estimate a higher resolution version of one of the middle frames. In such implementations, this estimation can be based not only on the lower-resolution version of the received frame, but also the lower-resolution version of the previous and subsequent frames also received. In some implementations, the hierarchical algorithm can be used to determine an unknown intermediate frame at the same resolution as previous and subsequent received frames.

In some implementations, a hierarchical algorithm may be used to estimate higher-resolution versions of the received lower-resolution frames, as well as a higher-resolution version of an unknown intermediate frame. Furthermore, in some implementations the hierarchical algorithm may also be used to estimate an unknown future or past frame based upon the received lower-resolution frames.

With reference to FIG. 1, in certain implementations, it may be desirable to obtain a super-resolved image 105 by optimizing the following function with respect to x:

$$\|\psi_c(x) - \phi_c(x_{LR})\|^2 + \sum_i \|\psi_{si}(x) - \psi_{sj(i)}(x_s)\|^2 \qquad \text{Equation 7}$$

where $\phi_c$ is a neural network that has been trained to predict content features of the high-resolution image from a low-resolution visual data $x_{LR}$ which may be received at step 101 and fidelity data $x_s$ which may have been received in the form of fidelity visual data, or may be present in a database of a device configured to execute the method, as shown at step 102. As with the above-mentioned implementation, patches (j(i)) are selected and optimized.

The approach can be further optimized at step 103 by finding similar patches in the plurality of fidelity data, $x_s^1, \ldots, x_s^K$, such that:

$$\|\psi_c(x) - \phi_c(x_{LR})\|^2 + \sum_i \|\psi_{si}(x) - \psi_{sj(i)}(x_s^{k(i)})\|^2 \qquad \text{Equation 8}$$

where k(i) represents the index of the fidelity data with the closest patch, $$(j(i), k(i)) = \mathrm{argmax}_{j,k} \frac{\psi_{si}(x)^T \psi_{sj}(x_s^k)}{\|\psi_{si}(x)\| \cdot \|\psi_{sj}(x_s^k)\|} \qquad \text{Equation 9}$$

The output may be further improved at step 104 by using a regularization with a probabilistic model with density p(x) fitted to the fidelity visual data, for example a mixture of conditional Gaussian scale mixtures, such that:

$$\alpha \|\psi_c(x_{HR}) - \phi_c(x_{LR})\|^2 + \qquad \text{Equation 10}$$
$$\beta \sum_i \|\psi_{si}(x) - \psi_{sj(i)}(x_s^{k(i)})\|^2 + \gamma \log p(x)$$

Additionally, at step 102, to remove the need to manually specify fidelity visual data, numerous pieces of visual data similar to $x_{LR}$ from a large database of visual data may be found automatically. In some implementations, this may be achieved by computing a relatively low-dimensional feature vector, $\phi(x_{LR})$, which has been optimized to approximate a feature vector of the high-resolution visual data, $\zeta(x_{HR})$. The feature vector may then be compared to the feature vector of every feature vector in the database to receive similar visual data, $x^i$, for example by maximizing the cosine similarity:

$$\frac{\varphi(x_{LR})^T \zeta(x^i)}{\|\varphi(x_{LR})\| \cdot \|\zeta(x^i)\|} \qquad \text{Equation 11}$$

The above-mentioned approach, specifically at step 102, may be scaled to a database of millions of image using approximate nearest neighbour search methods. In yet another implementation, a hash-table for the above-mentioned feature vectors may be queried so as to return appropriate fidelity visual data. The hash function used to query the hash-table may itself be a learned function. In some implementations, temporal features in the visual data may be used to select the most appropriate fidelity visual data to use or other visual data classifiers may be used to select a subset of the fidelity visual data stored in a device configured to perform the method. The method of selecting the appropriate fidelity visual data may be repeated for a plurality of sections of the lower-quality visual data, whereby the sections may be similar or based on a pre-defined extraction metric. It will be appreciated other methods may be used to find similar visual data from a large database of visual data.

In a further implementation, the approach may be directed towards the application of fidelity visual data across a number of frames of visual data, such as a plurality of frames of video data. In some implementations, the above-mentioned methods where $\psi$, $\psi_c$, $\psi_s$ are derived from neural networks trained for object recognition may be extended such that $\psi$, $\psi_c$, $\psi_s$ may also be derived from neural networks trained on video data. In this implementation, patches may be classified and identified over a plurality of frames of the video data such that there is a temporal consistency across the frames of video data. In another implementation, the fidelity visual data may be applied to a group of neighbouring frames to ensure consistency in the increased fidelity visual data produced by the method. Additionally, the fidelity visual data may comprise a series of camera movements which could be applies to the content of the video. Examples of such camera movements may include camera shake or motion blur, however the person skilled in the art will appreciate other camera styles may be used.

It should also be appreciated that specific combinations of the various features described and defined in any aspects can be implemented and/or supplied and/or used independently.

Further implementations are summarized in the following examples:

Example 1

A method for developing improved-fidelity visual data using fidelity data and using a hierarchical algorithm, the method comprising the steps of: receiving at least a plurality of neighbouring sections of visual data; selecting a plurality of input sections from the received plurality of neighbouring sections of visual data; extracting features from the plurality of input sections of visual data; and producing the improved-fidelity visual data by applying the fidelity data to the extracted features.

Example 2

A method according to example 1, wherein applying the fidelity data to the extracted features comprises performing a fidelity transfer.

Example 3

A method according to example 1 or example 2, wherein applying the fidelity data to the extracted features comprises optimising a function dependent on content features of the input sections, and features of the fidelity data.

Example 4

A method according to any one of the preceding examples, wherein applying the fidelity data to the extracted features comprises transposing features of the fidelity data onto the content of the extracted features.

Example 5

A method according to any one of the preceding examples, wherein said features of the fidelity data comprise high-frequency features of the fidelity data.

Example 6

A method according to any one of the preceding examples, wherein the selected input sections comprise lower quality visual data and the improved-fidelity visual data comprises higher quality visual data.

Example 7

A method according to example 6, wherein the higher quality visual data comprises visual data having a higher resolution compared to said lower-quality visual data.

Example 8

A method according to any one of the preceding examples, wherein the improved-fidelity visual data includes additional visual data which was not present in the input sections selected from the received plurality of neighbouring sections of visual data.

Example 9

A method according to example 8, wherein the additional data comprises high-frequency visual data.

Example 10

A method according to any one of the preceding examples, wherein the extracted features are extracted using the hierarchical algorithm.

Example 11

A method according to any one of the preceding examples, wherein the hierarchical algorithm comprises a neural network.

Example 12

A method according to example 11, wherein the neural network comprises a convolutional neural network.

Example 13

A method according to any one of the preceding examples, further comprising selecting the fidelity data based on similarity with the input sections, wherein similarity is determined using a predetermined function.

Example 14

The method of any one of the preceding examples, wherein the fidelity data is extracted from a plurality of fidelity visual data.

Example 15

The method of example 14, comprising the steps of receiving the plurality of fidelity visual data.

Example 16

The method of any of examples 14 or 15, wherein the plurality of fidelity visual data are selected such that a pre-determined similarity function is maximized.

Example 17

The method of any one of the preceding examples, wherein a section of the visual data comprises a sequence of frames of visual data or a region within a frame or sequence of frames of visual data.

Example 18

The method of any one of the preceding examples, wherein the visual data comprises a plurality of frames of video.

Example 19

The method of any one of the preceding examples, wherein the visual data comprises a plurality of rendered frames.

Example 20

The method of any one of the preceding examples, wherein the received plurality of neighbouring sections of visual data are consecutive sections of visual data.

Example 21

The method of any one of the preceding examples, wherein the selecting of a plurality of input sections of visual data comprises a patch-based analysis of the received sections of visual data.

Example 22

The method of any one of examples 1 to 20, wherein the selecting of a plurality of input sections of visual data comprises a segment-based analysis of the received sections of visual data.

Example 23

The method of any one of the preceding examples, wherein the hierarchical algorithm comprises a plurality of layers.

Example 24

The method of example 23, wherein the layers are any of sequential, recurrent, recursive, branching or merging.

Example 25

The method of any one of the preceding examples, wherein the extracting of features is based on a predetermined extraction metric.

Example 26

The method of any one of the preceding examples, wherein the hierarchical algorithm is developed using a learned approach.

Example 27

The method of example 26, wherein the learned approach comprises machine learning techniques.

Example 28

The method of any one of the preceding examples, wherein the hierarchical algorithm is a non-linear hierarchical algorithm.

Example 29

The method of any one of the preceding examples, wherein the hierarchical algorithm uses super-resolution techniques.

Example 30

The method of any one of the preceding examples, wherein the hierarchical algorithm uses a spatio-temporal approach.

Example 31

The method of any one of the preceding examples, wherein the plurality of input sections comprises at least one higher fidelity input.

Example 32

The method of any one of the preceding examples, wherein the plurality of input sections comprises a plurality of higher fidelity inputs.

Example 33

The method of any one of the preceding examples, wherein the fidelity data comprises one or more images.

Example 34

The method of any one of the preceding examples, wherein the fidelity data comprises data produced by a hierarchical algorithm trained to extract features from higher quality visual data.

Example 35

A method substantially as hereinbefore described in relation to FIG. 1.

Example 36

Apparatus for carrying out the method of any preceding example.

Example 37

Apparatus comprising: at least one processor; and at least one memory including computer program code which, when executed by the at least one processor, causes the apparatus to perform the method of any one of examples 1 to 34.

Example 38

A computer program product comprising software code for carrying out the method of any of examples 1 to 34.

Example 39

A computer-readable medium having computer-readable code stored thereon, the computer-readable code, when executed by at least one processor, causing the performance of the method of any one of examples 1 to 34.

What is claimed is:

1. A method for generating higher quality visual data from lower quality visual data using fidelity transfer, the method comprising:
   receiving input visual data representing at least one image, the input visual data including lower quality visual data;
   selecting fidelity visual data from a database of fidelity visual data based on similarity with the lower quality visual data, the fidelity visual data having a resolution higher than the lower quality visual data;
   extracting features from the lower quality visual data; and
   estimating, by a hierarchical algorithm, higher quality visual data from the lower quality visual data and the fidelity visual data, the higher quality visual data having a resolution higher than the lower quality visual data,
   wherein the estimating includes transposing the fidelity visual data onto content of the extracted features of the lower quality visual data.

2. The method of claim 1, wherein the similarity is determined using a cosine similarity function.

3. The method of claim 1, wherein the fidelity visual data includes a plurality of features, wherein the plurality of features are computed by a neural network trained on object recognition.

4. The method of claim 3, wherein the plurality of features of the fidelity visual data include one or more content features and one or more style features.

5. The method of claim 1, wherein the database includes a plurality of feature vectors, wherein the selecting the fidelity visual data includes:
   computing a feature vector for the lower quality visual data, the feature vector configured to approximate a feature vector of the higher quality visual data; and
   comparing the feature vector to the plurality of feature vectors of the database to obtain the fidelity visual data.

6. The method of claim 5, wherein the comparing includes maximizing a cosine similarity between the feature vector and one or more of the plurality of feature vectors included in the database.

7. The method of claim 1, wherein the higher quality visual data includes additional visual data that is not included in the lower quality visual data.

8. The method of claim 1,
   wherein the estimating includes estimating the higher quality visual data based on a cost function, wherein the cost function includes a regularization with a probabilistic model fitted to the fidelity visual data.

9. The method of claim 1, wherein the features of the lower quality visual data are extracted using the hierarchical algorithm.

10. The method of claim 1, wherein the hierarchical algorithm includes a neural network, the neural network includes a convolution neural network.

11. The method of claim 1, wherein the lower quality visual data includes a sequence of video frames.

12. The method of claim 1, wherein the selecting includes executing a patch-based analysis of the lower quality visual data, the patch-based analysis including comparing features of patches of the fidelity visual data to features of the lower quality visual data.

13. The method of claim 1, further comprising:
extracting, by a neural network, frequency features from the fidelity visual data,
wherein the transposing the fidelity visual data onto the content of the extracted features of the lower quality visual data includes transposing the frequency features of the fidelity visual data into the content of the extracted features of the lower quality visual data.

14. The method of claim 1, further comprising:
extracting, using a first neural network trained to predict content features of higher quality visual data from the lower quality visual data, content features from the lower quality visual data;
extracting, using activations of different layers in a second neural network trained for object recognition, frequency features of the fidelity visual data from the fidelity visual data,
wherein the higher quality visual data is estimated using a cost function, wherein the cost function is defined for the higher quality visual data as a sum of:
a squared error between content features extracted from a section of higher quality visual data using the activations of different layers in the second neural network and the extracted content features of the lower quality visual data, and
a squared error between frequency features extracted from a section of higher resolution visual data using activations of the different layers in the second neural network and the extracted frequency features of the fidelity visual data.

15. An apparatus comprising:
at least one processor; and
at least one memory including computer program code which, when executed by the at least one processor, causes the at least one processor to:
receive input visual data representing at least one image, the input visual data including lower quality visual data;
select fidelity visual data from a database of fidelity visual data, the fidelity visual data including a plurality of features, the plurality of features being computed by a neural network trained on object recognition;
extract features from the lower quality visual data; and
estimate, by a hierarchical algorithm, higher quality visual data from the lower quality visual data and the fidelity visual data, including transpose the plurality of features of the fidelity visual data onto content of the extracted features of the lower quality visual data, the higher quality visual data having a resolution higher than the lower quality visual data.

16. The apparatus of claim 15, wherein the database includes a plurality of feature vectors, wherein the at least one memory includes computer program code that when executed by the at least one processor causes the at least one processor to:
compute a feature vector for the lower quality visual data, the feature vector configured to approximate a feature vector of the higher quality visual data; and
compare the feature vector to the plurality of feature vectors of the database to obtain visual data similar to the lower quality visual data by maximizing a cosine similarity between the feature vector and one or more of the plurality of feature vectors included in the database, the visual data including the plurality of features of the fidelity visual data.

17. The apparatus of claim 15, wherein the plurality of features of the fidelity visual data include one or more content features and one or more style features, the features of the lower quality visual data are extracted using the hierarchical algorithm.

18. A non-transitory computer-readable medium having computer-readable code stored thereon, the computer-readable code, when executed by at least one processor, causes the at least one processor to:
receive input visual data representing at least one image, the input visual data including lower quality visual data;
select fidelity visual data from a database of fidelity visual data based on similarity with the lower quality visual data, wherein the similarity is based on maximizing a cosine similarity function;
extract features from the lower quality visual data; and
estimate, by a hierarchical algorithm, higher quality visual data from the lower quality visual data and the fidelity visual data, including execute a fidelity transfer by transposing the fidelity visual data onto content of the extracted features of the lower quality visual data, the higher quality visual data having a resolution higher than the lower quality visual data.

19. The non-transitory computer-readable medium of claim 18, wherein the database includes a plurality of feature vectors, wherein the computer-readable code further includes computer-readable code that, when executed by the at least one processor, causes the at least one processor to:
compute a feature vector for the lower quality visual data, the feature vector configured to approximate a feature vector of the higher quality visual data; and
compare the feature vector to the plurality of feature vectors of the database to obtain visual data similar to the lower quality visual data.

20. The non-transitory computer-readable medium of claim 18, wherein the database includes a plurality of feature vectors, wherein the computer-readable code further includes computer-readable code that, when executed by the at least one processor, causes the at least one processor to:
extract, using a first neural network trained to predict content features of higher quality visual data from the lower quality visual data, content features from the lower quality visual data; and
extract, using activations of different layers in a second neural network trained for object recognition, frequency features of the fidelity visual data from the fidelity visual data,
wherein the higher quality visual data is estimated using a cost function, wherein the cost function is defined for the higher quality visual data as a sum of:
a squared error between content features extracted from a section of higher quality visual data using the activations of different layers in the second neural network and the extracted content features of the lower quality visual data, and a squared error between frequency features extracted from a section of higher resolution visual data using activations of the different layers in the second neural network and the extracted frequency features of the fidelity visual data.

* * * * *